Nov. 17, 1925.
W. J. CASHIN
1,561,460
GUY WIRE HOLDER
Filed March 20, 1925     2 Sheets-Sheet 1
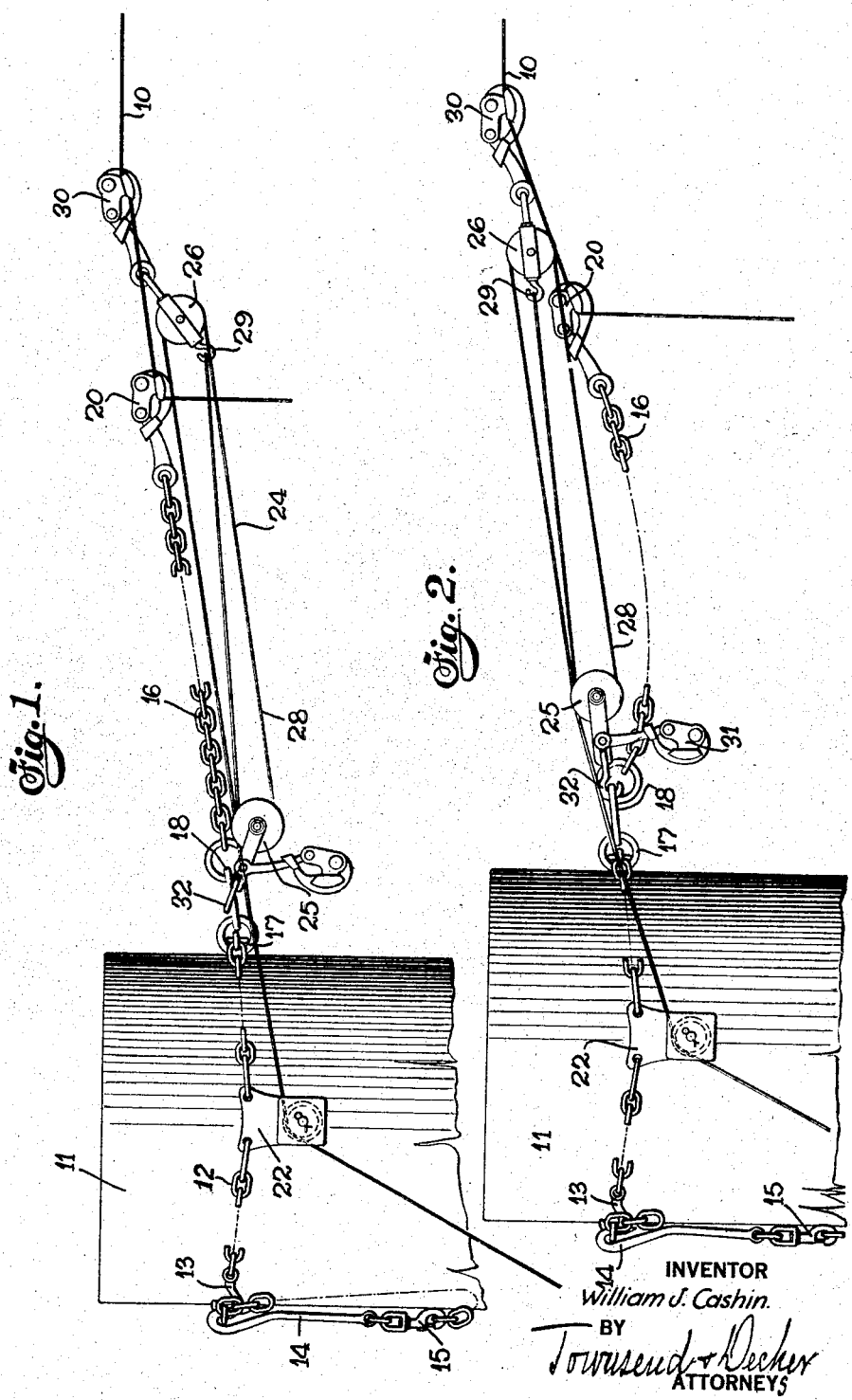
INVENTOR
William J. Cashin.
BY
Townsend + Decker
ATTORNEYS Nov. 17, 1925.
W. J. CASHIN
1,561,460
GUY WIRE HOLDER
Filed March 20, 1925
2 Sheets-Sheet 2
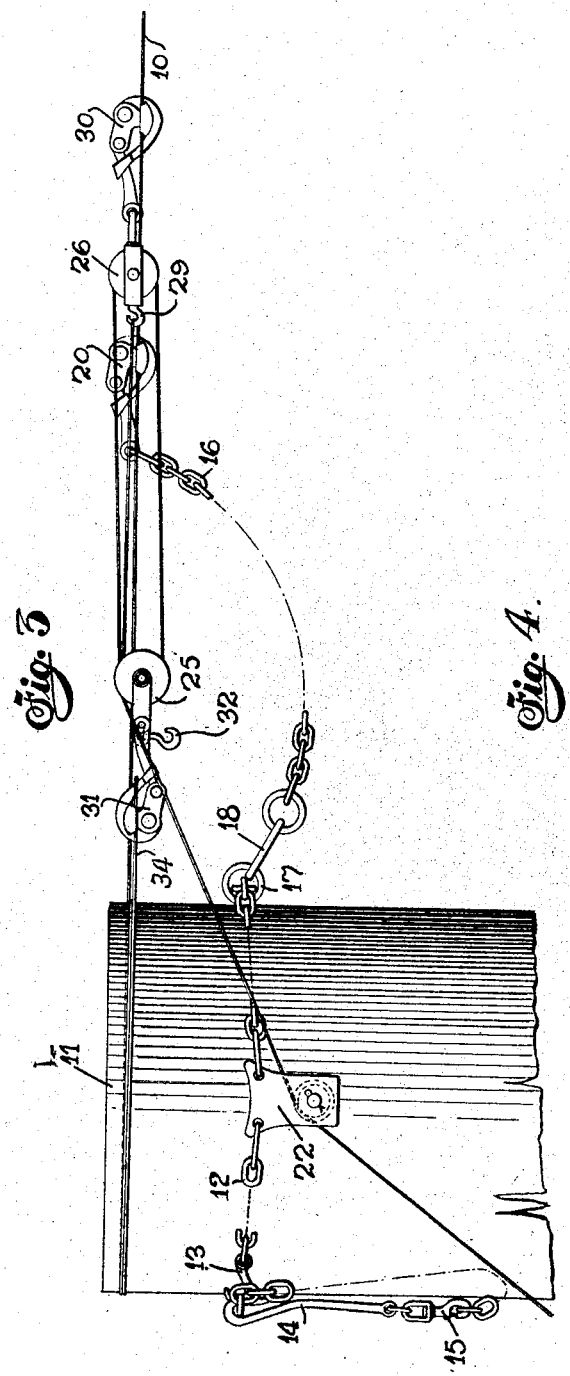
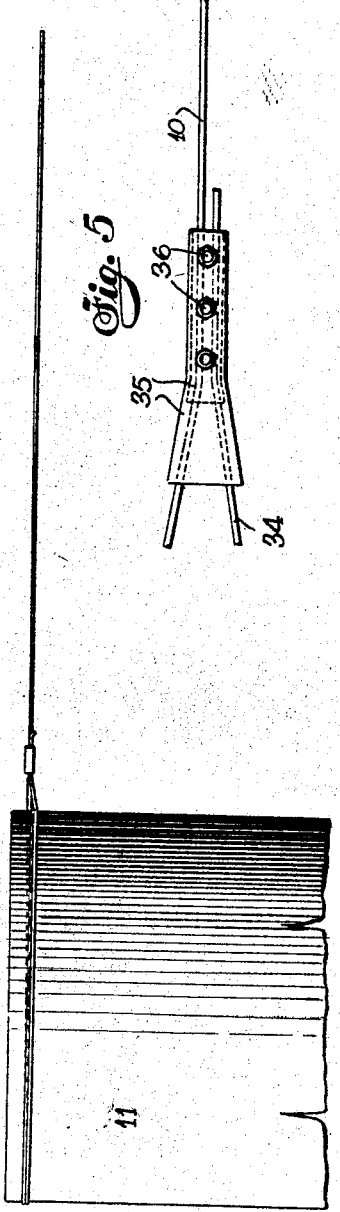
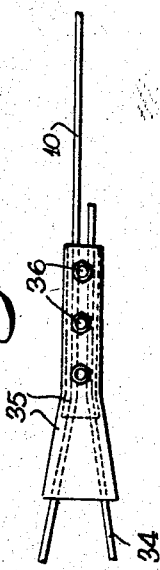
INVENTOR
William J. Cashin
BY
Townsend + Decker
ATTORNEYS Patented Nov. 17, 1925.

1,561,460

UNITED STATES PATENT OFFICE.

WILLIAM J. CASHIN, OF NEW YORK, N. Y.

GUY-WIRE HOLDER.

Application filed March 20, 1925. Serial No. 16,890.

*To all whom it may concern:*

Be it known that I, WILLIAM J. CASHIN, a subject of the King of Great Britain, and a resident of New York, in the county of Bronx and State of New York, have invented certain new and useful Improvements in Guy-Wire Holders, of which the following is a specification.

This invention relates to a mechanism for tightening guy or stay wires with respect to a supporting post or base structure. It is a primary object of the invention to provide a mechanism permitting the wire or cable to be progressively tightened with respect to the relatively rigid supporting post or base in such manner that the free end of the wire or cable can be passed around the supporting post and drawn taut with respect to the body of the cable and the parts secured together without releasing the tension.

It is a further object to so construct the parts that they may be conveniently assembled and disassembled.

Other and more specific objects will appear as the description proceeds.

Referring to the drawings:

Fig. 1 shows the entire mechanism in assembled position.

Fig. 2 shows the condition of the parts after some power has been applied to the cable.

Fig. 3 shows the method of tightening the free end of the cable with respect to the body thereof.

Fig. 4 shows the finished product.

Fig. 5 is an elevational view of the clamp used for securing the extended end of the cable to the body thereof.

In the drawings I have shown a portion of a guy wire or cable 10 which is adapted to be tightened with respect to and secured to a supporting base shown as post 11. It is to be understood that the type of wire or cable 10 or supporting base 11 forms no part of my present invention and that my invention is not limited to the type shown. The tensioning mechanism formed according to my invention comprises a stay or supporting element formed as a section of chain 12 which is preferably provided with a main securing hook 13 and a supplemental locking hook 14. The locking hook 14 may be detachably secured to the chain section 12 as by means of the snap hook 15. The loop 12 is adapted to encircle the post 11 and by passing the hook 13 over a section of a chain 12 and inserting the point of the locking hook 14 in advance of the hook 13 a strong and secure junction is formed between the sections of the chain. This leaves the loop in the position shown in Figs. 1 to 3. The particular form of supporting loop 12 may obviously be varied, for example a large hook or other structure may be used to encircle the post without departing from my invention.

The loop 12 is provided on one side thereof with a connecting member formed as a short section of chain 16 which may be permanently secured to the chain as by means of the links 17 and 18. The outer or free end of the section 16 carries a wire clamping element 20 which is adapted when tension is applied thereto to securely grasp and clamp the guy wire or cable. I have shown the supporting pulley block 22, carrying idler pulley 23, as permanently formed into the chain section 12 and preferably spaced from the loops 17 and 18. The function of the pulley 23 is referred to hereinafter. The power element for the tensioning mechanism proper is preferably of the block and tackle type and is referred to as a whole at 24. The block and tackle includes the relatively movable blocks of pulleys 25 and 26 around which there is wound a cable 28. The cable 28 is secured to one block as at 29 and after passing through the various pulleys of both blocks is extended through the pulley block 22 as indicated at Figs. 1 to 3 so as to give a direct pull against the main guy wire 10. The pulley block 26 is provided with a wire clamping element 30. The other pulley block is provided with a wire clamping element 31 and also with a detachable securing hook 32 for a purpose to be hereinafter referred to.

In Figs. 4 and 5 I have shown a form of wire clamp wherein the cooperating elements 35 embrace the main section 10 of the guy wire and extended end 34 thereof, so that as the nuts 36 are tightened the sections of the guy wire are clamped together.

The operation of my apparatus is as follows:

After the loop 12 has been secured around the post 11 the guy wire 10 is passed through the securing clamp 20 and is drawn as tight as can be conveniently done by hand; the block and tackle mechanism 24 is then attached by means of the hook 32 to the link 18 of the stay chain, block 26 having the clamping element 30 thereof secured to the stay wire 10. The cable 28 of the block and tackle is then passed over the pulley 23 and extends to a point where it may be conveniently drawn upon to cause the pulley blocks 25 and 26 to approach one another so as to tension the wire 10. The position of the parts during this operation is shown in Fig. 2.

If the first operation of the block and tackle does not sufficiently tension the guy wire 10 the hook 20 may be reconnected to the guy wire with the chain sections 16 drawn out to its full length so that the pull upon the block and tackle 24 may be released, the wire 10 being held by the stay chain 16. The hook 30 can then be secured again to the wire 10 with the block and tackle extended and ready for a second operation. This may be repeated as many times as necessary to give the desired degree of tension to the wire 10. The hook 20 is then secured to the wire 10 so that the hook 32 can be released from the supporting chain 12 and the extended end of the guy wire is then enwrapped around the post 11. The pulley block 25 is then secured to the extended end 34 of the guy wire 10 by means of its clamp 31 and upon the application of power to the block and tackle 24 the extended end 34 of the guy wire 10 is drawn toward the body thereof so that these parts are given the desired tension and upon the application of the clamping elements 35 the guy wire is secured to the post fully tensioned. It will be seen that the location of the pulley support 22 upon one side of the supporting loop 12 causes the main portion of the guy wire 10 to be drawn toward the extended end of the guy wire in proper position for these parts to be conveniently secured together.

While I have shown and described a specific embodiment of my invention it is obvious that changes may be made therein so long as they fall within the scope of the appended claims.

I claim as my invention:

1. A wire or cable tightening mechanism comprising a supporting element, means for securing the same directly to said wire or cable to retain the degree of tautness achieved between said element and said wire or cable, a power appliance having relatively movable members and having means for attachment of one of said members to said wire or cable, and means for securing the other of said members to either said supporting element or to an extended end of said wire or cable permitting said power appliance to draw said wire or cable toward either said supporting loop or toward the extended end of said wire or cable.

2. A wire or cable tightening mechanism comprising a supporting loop, a block and tackle having at one end thereof means for attachment to said wire or cable at a point spaced from the end thereof and having at the other end thereof means for attachment to said supporting loop or to an extended end of said wire or cable and guiding means for said tackle supported by said loop.

3. A wire or cable tightening mechanism comprising a supporting loop, a block and tackle having at one end thereof means for attachment to said wire or cable at a point spaced from the end thereof and having at the other end thereof means for attachment to said supporting loop or to an extended end of said wire or cable and a guiding pulley secured directly to said loop.

4. A wire or cable tightening mechanism comprising a supporting element, means for progressively tightening said wire or cable comprising wire gripping means connected directly to said element, a block and tackle having at one end thereof means for attachment to said wire or cable and having at the other end thereof means for attachment either to said element or to an extended end of said wire or cable, whereby said wire or cable may be progressively tightened with respect to said element or with respect to the extended end of said wire or cable.

5. In a device of the character described, a supporting element, a connecting member secured to said element and having means for attachment to a wire or cable, a power appliance having relatively movable parts, means connected with one of said parts for attachment to said wire or cable, means for detachably connecting the other of said parts with said supporting element, an attachment member having means for detachable connection to an extended end of said wire or cable and for connection with said second-named part of said power appliance.

Signed at Yonkers, in the county of Westchester and State of New York this 10th day of March A. D. 1925.

W. J. CASHIN.